United States Patent Office 3,541,156
Patented Nov. 17, 1970

3,541,156
1,4-OXAPHOSPHONIUM PYRANE HALIDES
Michel Simalty, Villejuif, and Hilmi Chahine, Paris, France, assignors to Etablissement Public: Centre National de la Recherche Scientifique, Paris, France, a corporation of France
No Drawing. Filed Jan. 4, 1968, Ser. No. 702,152
Claims priority, application France, Jan. 6, 1967, 90,294; Dec. 26, 1967, 133,760
Int. Cl. C07f 9/02
U.S. Cl. 260—606.5         15 Claims

ABSTRACT OF THE DISCLOSURE

Substituted oxa-4-phosphonium halides of the formula:

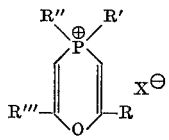

wherein R and R''' are each a hydrogen atom, an alkyl or aryl radical or a heterocycle, R' and R'' are alkyl or aryl radicals, and X is chloride or bromine; a novel process for their preparation by the reaction of an α-halogenated ketone R—CH—CH$_2$X and an acetylenic tertiary phosphone

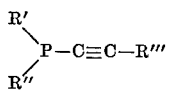

R, R', R'', R''' and X having the same meaning as above. These compounds find utility as antiinfection, antiseptic, antifungal and antiparasitic agents.

---

It is an object of this invention to provide novel substituted oxa-4-phosphonium halides which find utility more particularly in the pharmaceutical art. A further object is to provide a novel process for the preparation of said substituted halides.

Other objects will be apparent from the detailed description which follows.

By the process of the invention substituted oxa-4-phosphonium halides are prepared by dissolving an α-halogenated ketone R—CO—CH$_2$X and an acetylenic tertiary phosphine

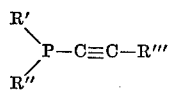

R, R', R'', R''' and X respectively having the same meaning as above defined, in an aprotic solvent, leaving said solution at rest at a room temperature during about 4 to 6 days, separating, washing and drying the crystals which are formed and purifying the resulting product by recrystallization from a solvent.

The ketone and the phosphine react together according to the following diagram:

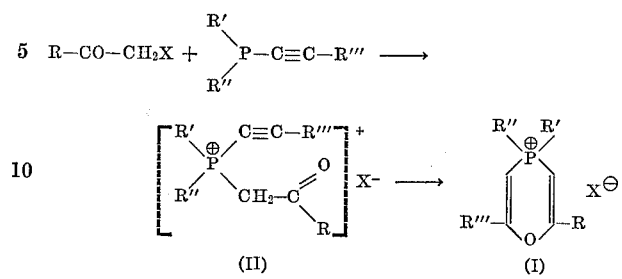

It may be considered that the phosphonium salts (II) which form in the course of the reaction as intermediary products are acetylene ketones of phosphonium halides in enolic form. Said salts undergo intramolecular cyclizations similar to those already known and found during the conversion of other γ-acetylenic ketones to 4-pyranes such as methylene-4-pyranes and arylimino-4-pyranes. By analogy the six ring-atom compounds hereof containing a phosphonium phosphorus in the 4-position are designated herein as "phosphonium pyranes."

The infrared spectra of the salts obtained by the above process comprise no acetyl lines at 2260–2190 cm.$^{-1}$ and no absorption due to carbonyl up to 1638 cm.$^{-1}$. The obtention of one and the same halide by using two couples of starting materials (see product 2 in the table hereinafter) is an evidence of the 6 link heterocyclic character of the products obtained.

Said products have the character of phosphonium salts, the absorption peaks are in most cases at about 267 mμ (in ethanol) which excludes the planeity of the heterocycle and the delocalization of the doublets. The spatial structure of the product would thus be the following:

Various aprotic solvents may be used for carrying out the reaction, such as benzene, ether, tetrahydrofuran, acetonitrile, dimethylformamide, hexamethyl-phosphatriamide and the like. According to the type of the solvent the reaction may be carried out in the hot or in the cold.

The following table contains data relating to the obtention of halides according to the invention. In each case the solvent used for the reaction was 1:1 mixture of benzene and hexamethyl-phosphatriamide (HMPT) but it should be noted that mixtures containing a higher proportion of HMPT may in certain cases lead to higher yields and reaction speeds. The products of the reaction crystallize after a period of time which varies from one case to another. If after 6 days no precipitate has formed the solution should be heated in a water bath. The purification of the products is obtained by recrystallization, either in the cold with solvents such as a mixture of chloroform and benzene, or in the hot with solvents such as methanol, ethanol water or acetic acid.

In the formulae appearing in the table φ represents a phenyl radical.

3,541,156

TABLE

| | | | | Analysis | | | | | | | | |
|---|---|---|---|---|---|---|---|---|---|---|---|---|
| | | | | Calculated | | | | Found | | | | |
| | Structure of the cation mass formula of the halide | Starting materials | Yield percent | M.P., °C. crystallisation solvent | C | H | Br | Cl | N | C | H | Br | Cl | N | $\lambda_{max}$ in EtOH (mμ) |
| 1 | C₁₈H₁₈BrOP | φ₂P—C≡C—CH₃, CH₃—CO—CH₂Br | 72 | 243-244, CHCl₃+C₆H₆ | 59.84 | 5.02 | 22.10 | | | 59.94 | 5.47 | 22.08 | | | 225, 267.6, 274 |
| 2 | C₂₃H₂₀BrOP | φ₂P—C≡C—CH₃, φ—CO—CH₂Br; φ₂P—C≡C—φ, CH₃—CO—CH₂Br | 86, 76 | 245-246, EtOH | 65.26 | 4.76 | 18.88 | | | 64.86 | 4.93 | 18.74 | | | 267 |
| 3 | C₂₂H₁₈ClOP | φ₂P—C≡C—φ, CHO—CH₂Cl | 25 | 245-246, CHCl₃+C₆H₆ | 72.43 | 4.97 | | 9.71 | | 72.20 | 5.20 | | 10.10 | | 267 |
| 4 | C₂₈H₂₂BrOP | φ₂P—C≡C—φ, φCO—CH₂Br | 91 | 316-317, CH₃COOH | 69.28 | 4.56 | 16.42 | | | 69.29 | 4.70 | 16.28 | | | 260 |
| 5 | C₂₈H₂₁Br₂OP | φ₂P—C≡C—φ, pBr C₆H₄—CO—CH₂Br | 78 | 306-307, EtOH | 59.59 | 3.75 | 28.34 | | | 59.00 | 3.92 | 27.97 | | | 265 |
| 6 | C₂₈H₂₁BrNO₃P | φ₂P—C≡C—φ, PNO₂C₆H₄—CO—CH₂Br | 85 | 305-306 | 63.41 | 3.99 | 15.08 | | 2.64 | 63.43 | 4.28 | 14.82 | | 3.29 | 267 |

TABLE—Continued

| Structure of the cation mass formula of the halide | Starting materials | Yield percent | M.P., °C. crystallisation solvent | Analysis | | | | | | | | | | $\lambda_{max}$ in EtOH (mμ) |
|---|---|---|---|---|---|---|---|---|---|---|---|---|---|---|
| | | | | Calculated | | | | | Found | | | | | |
| | | | | C | H | Br | Cl | N | C | H | Br | Cl | N | |
| 7 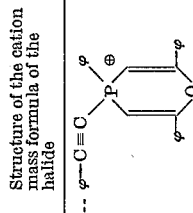 $C_{30}H_{22}BrOP$ | $\varphi P(C\equiv C\varphi)_2, \varphi\text{—CO—CH}_2Br$ | 47 | 240.5–241.5, $CHCl_3 + C_6H_6$ | 70.73 | 4.36 | 15.70 | | | 70.29 | 4.71 | 15.64 | | | 245.5 |
| 8 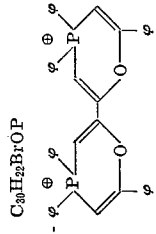 $C_{44}H_{34}Br_2O_2P_2$ | $\varphi_2P\text{—C}\equiv\text{C—}\varphi, BrCH_2\text{—C—C—CH}_2Br$ (O O) | 60 | 293–294, $H_2O$ | 64.72 | 4.20 | 19.57 | | | 64.89 | 4.34 | 19.74 | | | 258 |
| 9 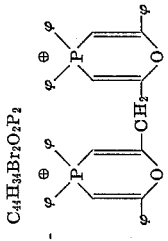 $C_{45}H_{36}Br_2O_2P_2$ | $\varphi_2P\text{—C}\equiv\text{C—}\varphi_2, BrCH_2C\text{—CH}_2C\text{—CH}_2Br$ (O O) | 65 | 292–293, Ethanol | 65.07 | 4.36 | 19.25 | | | 64.66 | 4.51 | 19.17 | | | 268 |

The halides mentioned in the above table are respectively:

(1) 2,6-dimethyl 4,4-diphenyl 1,4-oxaphosphonium pyrane bromide
(2) 2-methyl, 4,6-triphenyl 1,4-oxaphosphonium pyrane bromide
(3) 4,4,6-triphenyl 1,4-oxaphosphonium pyrane chloride
(4) 2,4,4,6-tetraphenyl 1,4-oxaphosphonium pyrane bromide
(5) 2,4,4-triphenyl p-6-bromophenyl 1,4-oxaphosphonium pyrane bromide
(6) 2,4,4-triphenyl p-6-nitrophenyl 1,4-oxaphosphonium pyrane bromide
(7) 2,4,6-triphenyl 4-phenylethynly 1,4-oxaphosphonium pyrane bromide
(8) 2,2'-bis (4,4,6-triphenyl-1,4-oxaphosphonium pyranyl) dibromide
(9) 2,2'bis (4,4,6-triphenyl-oxa-4-phosphonium) dibromide methane.

The following are examples of manufacture of oxa-4-phosphonium halides according to the invention.

EXAMPLE 1

2,6-dimethyl-4-4-diphenyl 1,4-oxaphosphonium pyrane bromide (Product 1 of the table)

3.103 gr. (0.0138 mole) diphenyl-propynylphosphine and 1.895 gr. (0.0138 mole) bromacetone were dissolved in 30 ml of a 1:1 mixture of HMPT and benzene. The mixture was left at room temperature over a period of 6 days. The crystals which formed were centrifuged, washed in benzene and ether, and dried. Yield 3.614 gr. The product was recrylstallized by dissolution in chloroform and addition of benzene (M.P. 243–244°C).

EXAMPLE 2

2,4,4,6-tetraphenyl 1,4-oxaphosphonium pyrane bromide (Product 4 of the table)

2.862 gr. (0.01 mole) diphenyl-phenylethynylphosphine and 1.99 gr. (0.01 mole) phenacyl bromide were dissolved in 30 ml of a 1:1 mixture of HMPT and benzene. The mixture was left at room temperature over a period of about 4 days. The crystals which formed were centrifuged, washed in benzene and ether and dried. Yield 4.459 gr. The product was recrystallized in acetic acid (M.P. 316–317° C).

EXAMPLE 3

2,4,6-triphenyl 4-phenylethynyl 1,4-oxaphosphonium pyrane bromide (Product 7 of the table)

3.103 gr. (0.01 mole) of diphenylphenylethynylphosphine and 1.99 gr. (0.01 mole) phenacyl bromide were dissolved in 30 ml of a 1:1 mixture of HMPT and a benzene. The mixture was left at room temperature over a period of 6 days. The crystals which formed were centrifuged, washed with benzene and ether and dried. Yield 2.396 gr. The product was recrystallized by dissolution in chloroform and addition of benzene (M.P. 240.5–241.5°C).

EXAMPLE 4

2,2'-bis (4,4,6-triphenyl-1,4-oxaphosphonium pyranyl) (Product 8 of the table)

11.45 gr. (0.04 mole) diphenylphenylethynylphosphine and 4.87 gr. (0.02 mole) dibromodiacetyl were dissolved in 100 ml of a 1:1 mixture of HMPT and benzene. The mixture was left at room temperature during one week. The crystals which formed were centrifuged, washed with benzene and ether and dried. Yield 9.64 gr. The product was recrystallized by dissolution in boiling water (M.P. 293–294°C).

The products of the invention may advantageously be used as hypotensor, for the treatment of various hypertensive conditions; as antispasmodic, e.g. for treatment of epilepsis; as respiratory analeptic, e.g. treatment of chronic respiratory insufficiencies.

The following tests have been made on various animals with products Nos. 1, 2, 4, 7 and 8, respectively, of the above table.

The toxicity of the products vary according to the solubility of the molecules, to the animal specie to which they are administered, and to the path of injection.

The DL50 on mice in the various cases were as follows:

Product No. 1:
 I.V.—10 mg./kg.
 I.P.—20 mg./kg.
 Oral—125 mg./kg.
Product No. 2:
 I.V.—26 mg./kg.
 I.P.—37 mg./kg.
 Oral—250 mg./kg.
Product No. 4:
 I.P.—100 mg./kg.
Product No. 7:
 I.P.—150 mg./kg.
 Oral—>500 mg./kg.
Product No. 8:
 I.P.—70 mg./kg.
 Oral—>1 g./kg.

The blood pressure of anesthetized dogs, cats and rats was recorded after I.V. administration of doses of product No. 1 comprised between 0.1 mg./kg. and T.O. mg./kg. In every case a hypertensive action of the partial nicotinic type, a cardiac analeptic action and an adrenergic sensibilizing action were observed. With the cat, hypertension is preceded by a cholinergic hypotensive phase.

I.V. administration of doses from 1.0 to 5.0 mg./kg. of product No. 2, led after an initial hypotensive phase to a substantial hypertension followed by durable hypotension. I.V. administration to the dog of doses from 2 to 10 mg./kg. of product No. 8 determines a relatively durable hypotension partly due to ganglioplegic effects, as shown by the inhibition of the retraction of the nictitant membrane under sympathetic nerve.

Product No. 7 showed to be active against the depressive action of morphine on the respiration of rabbits after I.V. administration of doses of 2 to 5 mg./kg.

At doses of about 1/10 LD 50 (I.P.) all the products Nos. 1, 2, 4, 7 and 8 extend significantly the sleep of mice, experimentally induced by barbiturates, chloral and chloromethiazole. At 100 mg./kg. per os, product No. 7 induces a short sleep in animals having previously received a subhypotic dose of pentobarbital.

Certain of the products such as No. 7 show a special, central excitation action for doses of 20 to 50 mg./kg. (I.P.) and lead to convulsive phenomena of the clonic type, which are relatively durable but regress spontaneously without fatal issue. At a low dose of 50 mg./kg. per os however, the same product No. 7 totally inhibits the tonic phase of the convulsions resulting from supramaximal electroshock or from the action of pentatetrazol. Such a dosis is not exciting per se but is slightly sedative.

Furthermore, most of the products according to the invention, inhibit the growth of various organisms and micro organisms such as certain staphylococci, streptococci and microbacteria, more particularly for the latter at concentrations of about one microgram per ml.

Said products may therefore be used as antiinfection, antiseptic, antifungal and antiparasitic agents.

What we claim is:

1. Substituted oxa-4-phosphonium halides of the formula:

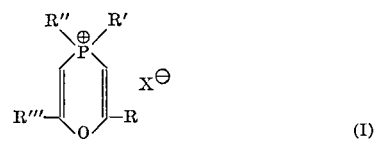

(I)

wherein R and R''' are each a member of the group consisting of hydrogen, alkyl and aryl, R' and R'' are each a member of the group consisting of alkyl and aryl, and X is a member of the group consisting of chlorine and bromine.

2. A method for the preparation of substituted oxa-4-phosphonium halides of the formula:

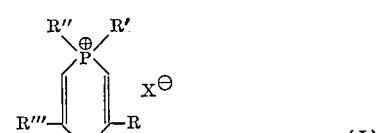

(I)

wherein R and R''' are each a member of the group consisting of hydrogen, alkyl and aryl, R' and R'' are each a member of the group consisting of alkyl and aryl, and X is a member of the group consisting of chlorine and bromine comprising steps of dissolving an α-halogenated ketone R—CO—CH$_2$X and an acetylenic tertiary phosphine

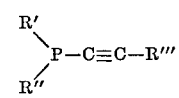

wherein R, R', R'', R''' and X have respectively the same meanings as above defined, in an aprotic solvent, whereby crystals of said substituted oxa-4-phosphonium halides are formed, and separating said crystals.

3. A method as claimed in claim 2 in which the aprotic solvent is a mixture of benzene and hexamethyl-phosphatriamide.

4. A method as claimed in claim 3 in which the aprotic solvent is a 1:1 mixture of benzene and hexamethyl-phosphatriamide.

5. A method as claimed in claim 2 wherein the separated crystals are washed dried and recrystallized from a solvent.

6. A compound of one of the formulae

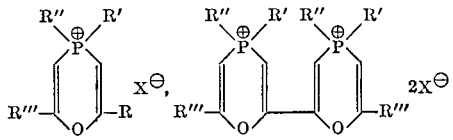

and

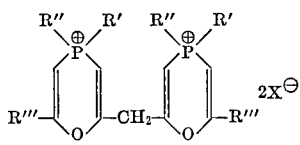

wherein each of R and R''' is, independently, a member selected from the group consisting of a hydrogen atom, methyl, phenyl, bromophenyl and nitrophenyl; each of R' and R'' is, independently, a member selected from the group X consisting of phenyl and phenylethynyl; and is a member selected from the group consisting of chlorine and bromine.

7. 2,6-dimethyl 4,4-diphenyl 1,4-oxaphosphonium pyrane bromide.

8. 2-methyl 4,4,6-triphenyl 1,4-oxaphosphonium pyrane bromide.

9. 4,4,6-triphenyl 1,4-oxaphosphonium pyrane chloride.

10. 2,4,4,6 - tetraphenyl 1,4 - oxaphosphonium pyrane bromide.

11. 2,4,4-triphenyl p-6-bromophenyl 1,4-oxaphosphonium pyrane bromide.

12. 2,4,4-triphenyl p-6-nitrophenyl 1,4-oxaphosphonium pyrane bromide.

13. 2,4,6-triphenyl 4-phenylethynyl 1,4-oxaphosphonium pyrane bromide.

14. 2,2'-bis (4,4,6-triphenyl 1,4-oxaphosphonium pyranyl) dibromide.

15. 2,2'-bis (4,4,6-triphenyl 1,4-oxaphosphonium pyranyl) dibromide methane.

References Cited

UNITED STATES PATENTS

| | | | |
|---|---|---|---|
| 3,037,950 | 6/1962 | Temin | 260—606.5 X |
| 3,142,685 | 7/1964 | Buckler et al. | 260—606.5 X |
| 3,206,496 | 9/1965 | Rauhut | 260—606.5 X |
| 3,309,425 | 3/1967 | Gillham et al. | 260—606.5 X |

OTHER REFERENCES

Chemical Abstracts, (1961), vol. 55, p. 1529, col. 2, QD. 1 A51.

Hendrickson, J.A.C.S. (1961), vol. 83, pp. 2018-9, QD 1. A5.

TOBIAS E. LEVOW, Primary Examiner

W. F. W. BELLAMY, Assistant Examiner

U.S. Cl. X.R.

424—209